Feb. 12, 1946.  C. V. SMITH  2,394,941
MOLDING APPARATUS
Filed July 3, 1943  2 Sheets-Sheet 1
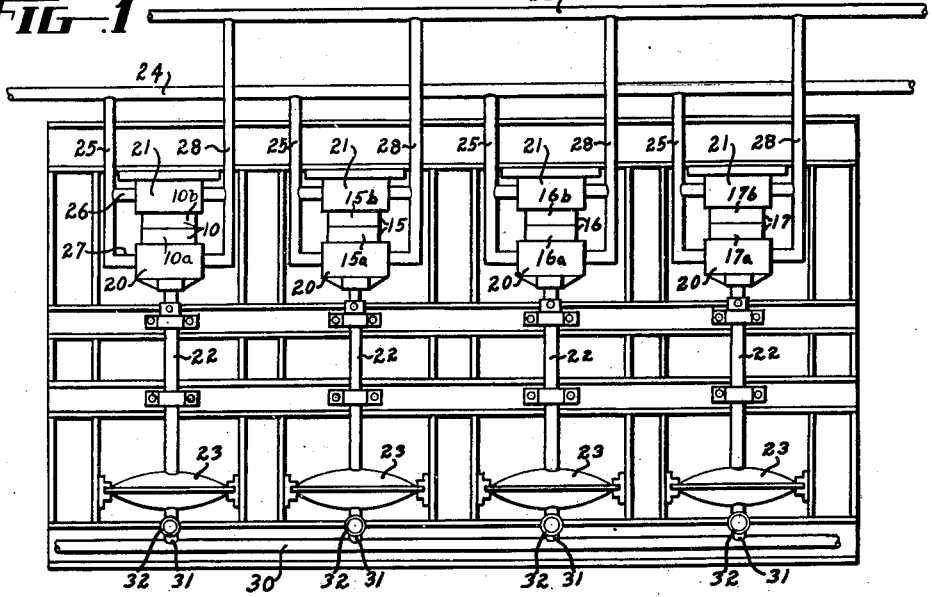
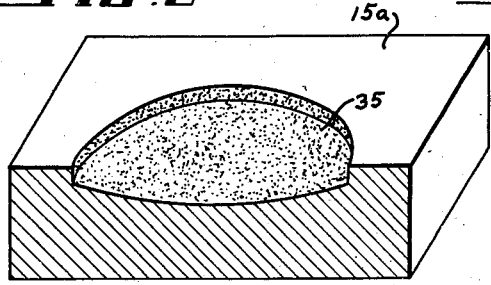
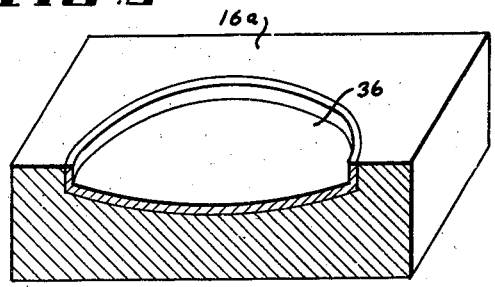
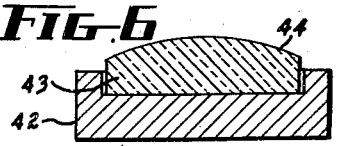
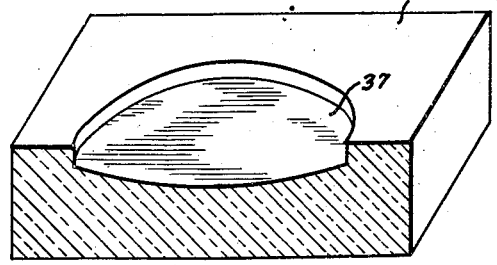
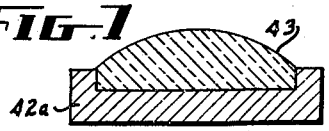
INVENTOR
CHARLES V. SMITH
BY
Toulmin & Toulmin
ATTORNEYS Feb. 12, 1946.   C. V. SMITH   2,394,941
MOLDING APPARATUS
Filed July 3, 1943   2 Sheets-Sheet 2
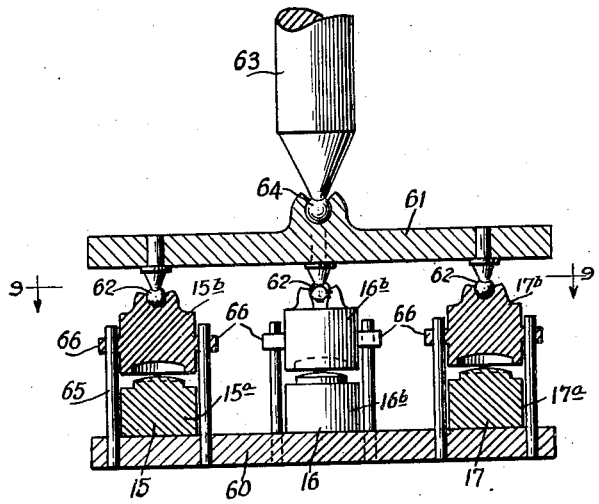
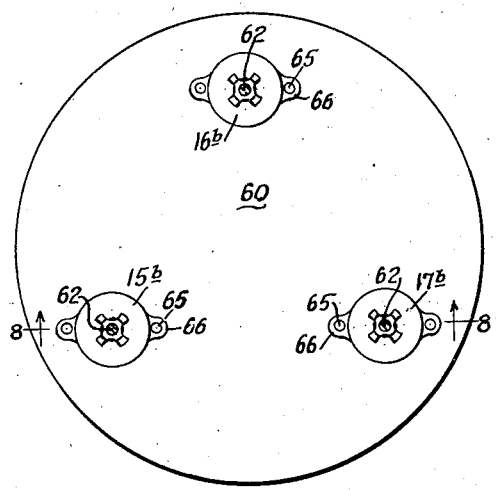
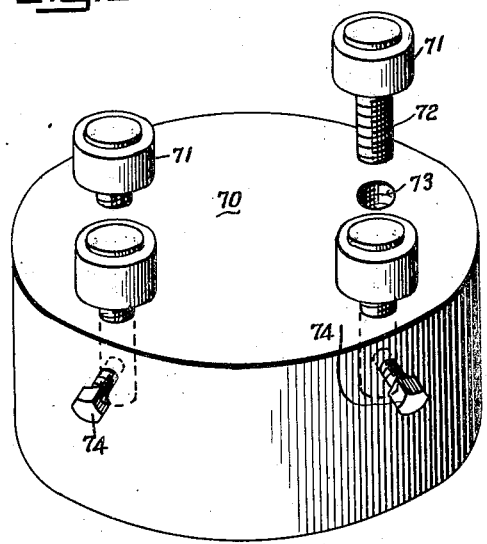
INVENTOR
CHARLES V. SMITH,
BY
*Toulmin & Toulmin*
ATTORNEYS Patented Feb. 12, 1946

2,394,941

UNITED STATES PATENT OFFICE 2,394,941

MOLDING APPARATUS

Charles V. Smith, Worcester, Mass., assignor to The Univis Lens Company, Dayton, Ohio, a corporation of Ohio Application July 3, 1943, Serial No. 493,390

4 Claims. (Cl. 18—19)

This invention relates to a method and apparatus for producing articles of optical perfection from synthetic resinous materials.

There have been previous attempts to produce true optical articles by forming blanks of resinous material into the shape of a lens or a plano. However, many of these former attempts have not been wholly satisfactory, since the surface finish of the lens or plano was not as perfect as it should be. Further, the lenses have contained strain, which can be referred to as optical strain, of sufficient value that the optical properties of the lens or plano were affected. In the previous attempts the lens or plano was formed in a single operation. This single operation generally produced optical strain of sufficient value to impair the optical properties of the lens or plano, specifically resulting in bi-refringence. Also, it has not been entirely impractical to form a lens in a single mold since the movement of the surface of the blank of resinous material has been affected deleteriously.

The forming dies for altering the configuration of a blank of resinous material into the shape of a lens or an optical plano, have been made from various materials, each of which have had certain disadvantages. To form a lens or plano in metal dies solely, it has been very difficult to produce a surface finish of sufficient optical perfection. The surface of the lens or plano formed in a single metal die has resulted in a surface which is pitted or wavy, since it has not been possible to produce a perfect surface upon the metal. While the imperfections are slight and imperceptible to the eye, yet they are of sufficient value to destroy the optical perfection of the surface of the lens or plano.

Glass dies have been tried for completely forming a lens or plano in a single operation. Many of the synthetic resins which have favorable optical characteristics have a considerable affinity for glass. Hence, when blanks of resinous material have been formed in glass dies to form a lens or plano, the resinous material has tended to adhere to the surface of the glass die, this retards the movement of the material within the die and results in imperfections upon the surface of the finished lens or plano. Also, the adhesion of the plastic to the glass has been sufficient to retard the surface movement of the plastic thereover to an extent that the internal mass of the blank of resinous material has been moved without noticeable surface movement. This action causes internal movement of the blank to an extent that produces strain of sufficient value to destroy the optical properties of the material.

The materials which have previously been used, and which have particular affinity for glass, have been those organic resins which are produced by the polymerization of the monomeric derivatives of acrylic or methacrylic acids. The substances used are commonly known to the trade as Plexiglas, Lucite, Crystalite, and others.

It is thus an object of my invention to provide a method for producing an optical article such as a lens or plano, having a surface which is of high optical perfection.

It is another object of my invention to provide a method for producing an optical article having high surface optical perfection by forming the article in a succession of forming dies.

It is another object of my invention to relieve stress developed by forming a blank of resinous material by successive forming and heating operations.

It is another object of my invention to form an optical article, such as a lens or plano, by forming the article in a succession of forming dies, each of which is more accurate as to optical curvature than the previous die.

It is still another object of my invention to provide a method for producing a lens or plano by a succession of forming operations, the earlier of which are carried out in metal dies and the last operation of which is carried out in a glass surfaced die.

It is another object of the invention to produce a lens or plano having surfaces of substantially true optical curvature within metal dies and to produce an optical surface finish for the lens or plano within glass dies.

It is still a further object of this invention to produce a lens or plano by a succession of forming operations, each of which is complete with a heating, forming and cooling operation, each of the operations bringing the lens or plano to a greater degree of accuracy of surface of optical curvature.

Another object of the invention is to provide a succession of forming dies for producing a lens or plano in a manner to produce equal forming pressure upon all the dies during forming operation.

Another object of the invention is to provide a companion set of forming dies for successive forming operations upon a blank of resinous material having means for providing equal pressure upon each of the companion dies simultaneously during the various successive forming operations.

Another object of the invention is to provide an apparatus for applying equal pressure upon a plurality of companion forming dies.

Another object of the invention is to arrange a companion set of three forming dies at the apexes of an equilateral triangle, whereby pressure applied upon the dies will be distributed equally between the same.

A still further object of the invention is to provide a companion set of forming dies having means for individual adjustment to arrange for even distribution of pressure therebetween.

A still further object of the invention is to produce a lens or plano from a blank of synthetic resin in a succession of complete forming operations consisting of heating, forming and cooling, each successive forming operation bringing the lens or plano to a greater degree of accuracy at each successive heating, relieving to some extent the stress developed by the previous forming operation.

Further objects and advantages will be apparent from the description and the drawings.

In the drawings:

Figure 1 is a diagrammatical representation of a system for producing a lens or plano according to the teachings of this invention, Figure 2 is a perspective view, partially in cross-section, of a cast metal die, Figure 3 is a perspective view, partially in cross-section, of a metal die having a highly finished surface of optical curvature, Figure 4 is a perspective view, partially in cross-section, of a glass die for producing the finished surface of optical curvature, Figure 5 is a cross-sectional view of a modification of the die of Figure 4, Figure 6 is a cross-sectional view of a further modification of the die of Figure 4, Figure 7 is a cross-sectional view of a third modification of the die of Figure 4, Figure 8 is a cross-sectional view taken along the line 8—8 of Figure 9, showing the grouping of a plurality of forming dies, Figure 9 is a cross-sectional view taken along the line 9—9 of Figure 8, and Figure 10 is an elevational perspective view of a modified form of die arrangement wherein the individual dies are adjustable in height.

In this invention, I provide a plurality of molds or dies which form a companion set for forming a blank of resinous material into a lens or plano by a succession of forming operations. In general, I provide a mold or die 10, provided with a face having an optical curvature. This die 10 provides a rough pre-forming of the blank of resinous material to a curvature somewhat approaching the curvature of the surface of a lens or plano. The blank of resinous material which has been preformed in the die 10, can subsequently be more accurately formed within the cast dies 15, the dies 16 having a highly finished surface of optical curvature, and the finishing glass dies 17.

The die 10, as well as the dies 15, 16 and 17, are positioned within suitable presses which consist of a lower die carrying member 20 and an upper die carrying member 21. The die carrying member 20 is positioned upon the end of a reciprocating plunger 22, which in turn is secured to a diaphragm motor 23.

The die carrying members 20 and 21 are provided with suitable passages therein for the circulation of a heating or cooling fluid therethrough. The heating or cooling fluid is circulated through the supply pipe 24. The fluid circulating through the supply pipe 24 is conducted to the die carrying members 20 and 21 by means of the conduits 25 and the branch conduits 26 and 27. The fluid circulates through the die carrying members 20 and 21, and discharges through the return conduit 28, which communicates with a return conduit 29. The supply line 24 may be alternately supplied with heating and cooling fluid according to the cycle of operation of the pressing molds supplied thereby. The entire group of companion molds may operate within a single cycle of operation wherein all of the molds heat, form and cool simultaneously, or a suitable valve arrangement and supply pipe system can be arranged to permit each of the presses to operate as a complete individual unit. In either case, the cycle of operation of the press will be the same, and will effect the sequential or successive forming operations upon a blank of resinous material which is altered in shape to form a lens or plano.

The diaphragm motors 23 are connected to a source of pressure supply, such as the conduit 30. The branch lines 31 for each of the air motors 23, are provided with a valve 32 which may be either manually or automatically controlled.

The dies 15 consist of a pair of metal castings 15a and 15b in which a surface of optical curvature 35 is provided in the die 15a. The surface of optical curvature 35 is cut to the desired curvature for the desired side of the curvature of a lens or plano. The die half 15b cooperating with the die half 15a is provided with the cooperating surface of optical curvature for producing a lens or plano. The optical curvature given the surface 35 and the cooperating surface of the die 15b is substantially the curvature which will produce a lens or plano into a substantially finished formed optical article. The surface of the cast metal dies, however, is not sufficiently perfect to provide a surface finish upon the blank of resinous material which has been formed therein. Also, since the cast metal dies 15 provide the first step of accurate formation, the exactness of the lens or plano need not be true within these dies, the purpose of the dies being to provide the greatest physical alteration required in the formation of the lens or plano, and move the greatest mass of material.

Subsequent forming operations will provide the desired degree of mathematical accuracy to the surface of optical curvature of the lens or plano, and provide a surface finish for the same. The dies 16 which consist of a pair of metal dies 16a and 16b are provided with a surface of optical curvature 36. The surface of optical curvature 36 is a highly finished metal surface, and may be provided by plating a very dense and hard metal, such as chromium, upon the surface which forms the surface of optical curvature. The chromium surface of the accurately cut surface of optical curvature 36 may be subsequently polished to provide a high degree of accuracy and smoothness. The dies 16, if desired, can be made from hard steel and the surface of optical curvature being accurately ground thereon and subsequently polished.

The blank of resinous material which has been formed in the dies 15 is placed within the dies 16 for a further forming operation. The polished face of the surface of optical curvature of the dies 16 will bring the blank of resinous material more nearly to the degree of mathematical accuracy desired for the surface of the lens or plano. Also, the high degree of finish of the dies will impart a higher degree of finish of optical perfection upon the surface of the blank of resinous material. However, since even the highly polished surface of the dies 16 is porous and somewhat wavy, the surface finish of the desired optical perfection is not obtainable in these dies.

The dies 17 which consist of the die members 17a and 17b are constructed of glass. The die member 17a having a surface of optical curvature 37 thereon. The glass dies 17 can be ground to the exacting degree of mathematical accuracy required for the production of complicated lenses, and can be polished to the extremely high degree required to produce a surface finish upon the blank of resinous material sufficient to give the blank a surface finish comparable with the glass. After the blank of resinous material has been prefinished in the dies 16, it is pressed within the dies 17 and formed therein to the exacting requirements of a highly accurate lens.

While the dies 17 can be made from glass blocks, yet it is also possible that the dies 17 can be made from metal blocks which are either surfaced with a glass face or have glass inserts positioned therein. Such modified arrangements are shown by Figures 5 to 7 inclusive, wherein the die 17 of Figure 5 consists of a metal base member 40 with a glass face 41 positioned therein. The modification of Figure 6 consists of a metal base 42 having a glass insert 43 which is loosely positioned within a recess in the base 42. The glass insert 43 is provided with the desired surface of optical curvature 44. The modification of Figure 7 is substantially the same as that of Figure 6 except that the metal base 42a is a metal which has the same coefficient of expansion as glass, so that the insert 43 can be secured permanently to the base 42a.

To produce a lens or optical plano from a blank of resinous material by the teachings of the method of this invention, a blank of material of the proper size and thickness is positioned upon the die half 10a. Pressure is applied to the air motor 23 by operation of the valve 32, whereby the plunger 22 moves the die half 10a into engagement with the die half 10b. Heat is applied to the die carrying members 20 and 21 whereby the temperature of the blank of resinous material upon the die 10 is elevated to a temperature determined by the temperature of the fluid circulating through the die carrying members 20 and 21. The rate of pressure application applied upon the resinous blank is controlled in accordance with a predetermined rate. This rate is determined by the temperature at which the blank is to be formed, and is determined to be the rate which will not produce deleterious optical strain within the blank during the forming operation. This optical strain is not of the same character normally thought of in connection with stress, but rather is of a character which causes a displacement of the optical paths through the blank of resinous material. The blank may be altered in physical shape and contain stress without containing the optical strain of sufficient value as to impair the optical properties of the blank of resinous material. Thus, the blank may be pre-formed to a shape which begins to approach the shape of a lens or plano between the die halves 10a and 10b.

After a determined interval of formation, cooling fluid may be circulated through the die carrying members 20 and 21 for reducing the temperature of the blank of resinous material below a temperature at which it would have a tendency to return to its normal unformed condition. If desired, the die carrying members 20 and 21 may be permitted to reduce in temperature, merely by stopping the flow of heating fluid. The blank of resinous material as removed from between the die halves 10a and 10b, has a curvature thereon imparted thereto by the die 10. However, the blank of resinous material will contain a certain amount of stress but substantially no optical strain, since it has been formed at a rate determined to be less than the rate which produces optical strain. The blank of resinous material is then placed through subsequent forming operations for producing an accurate surface of optical curvature and for producing a finishing surface upon the blank of high optical perfection.

The pre-formed blank of resinous material removed from the die 10 is placed within the dies 15. Since the formed blank contains internal stress produced by the previous forming operation, the dies 15 are closed upon the formed blank and a pressure applied thereupon by means of the diaphragm motor 23a. Since the formed blank is placed within the dies 15 in a cold condition, the order of pressure which can be applied upon the dies is relatively light to prevent any alteration of the physical shape of the blank while cold. However, upon heating the blank to elevate its temperature to permit forming thereof within the dies 15, the pressure applied to the die must be increased to prevent the formed blank from attempting to return to its normal preformed condition due to the tendency of relief of internal stress upon heating. At this point, however, it must be observed that the pressure which is applied to the blank of resinous material is of an order which is determined to produce a rate of formation of the blank which will not create optical strain. After the pressure has increased upon the dies 15 to a point which balances the tendency of the blank to return to normal position, the dies 15 will cause a further formation of the blank of resinous material.

As heretofore mentioned, the dies 15 are provided with surfaces of optical curvature which approximate the surfaces of optical curvature to be produced upon the lens or plano. Thus, the dies 15 are arranged to produce the greatest mass movement of the blank of resinous material and provide the substantially correct surface of curvature upon the blank. The pressure increase upon the dies 15 is governed in accordance with the aforementioned predetermined rate of formation so that when the blank is completely formed within the dies 15, there will be substantially no optical strain, although, there may be some stress.

Since synthetic resinous materials are all accompanied by the characteristic of plastic flow, it can readily be seen that the second heating of a formed blank will have a tendency to relieve the stress of forming from the previous operation, since the normal tendency of the material will be to flow upon a re-heating as long as there is stress within the blank of material. While the stress of the previous forming operation may be substantially relieved during the early portion of the second operation, additional stress is added by the additional forming operation so that the blank of resinous material leaves the second forming operation with stress, but substantially no optical strain.

Upon completion of the forming operation, the dies 15 may be cooled to permit the blank to reduce in temperature below a temperature at which it would tend to return to the normal preformed condition, whereby the blank may be removed from the dies.

Upon removal of the blank of resinous material from the dies 15, the approximate curvature of the lens or plano has been imparted thereto. However, as previously stated, the cast dies 15 cannot impart a surface finish to a blank of resinous material of sufficiently high degree to satisfy optical requirements. Hence, the formed blank is then placed within the dies 16. These dies, as previously described, are provided with a highly finished metal surface and are of considerably more accurate curvature than the previous dies 15. The dies 16 form the blank of resinous material to the new form of curvature of the dies 16, and upon heating therein, tend to relieve the stress of forming of the previous operation. Since the die 16 is not for the purpose of moving large masses of material, the stress relief within this die is considerably greater than encountered in the dies 15. At this point of forming, the blank of resinous material has substantially the exact curvature of a lens or plano. The surface finish however, is still insufficient for optical perfection.

The forming operations to this point, have been accomplished in metal dies, since the heat transfer of metal dies is considerably higher than through any other form of material, and can more uniformly apply heat to a blank of resinous material, which uniformity is particularly noticeable for lenses having varying thicknesses of material in various portions thereof.

The blank of resinous material is hereafter placed within dies having surfaces of optical curvature which are faced with glass, or the die itself can be constructed of glass. Normally glass is not a successful medium for forming resinous material, since the material has an affinity for the glass when any large mass of material is moved. The affinity of the resin for the glass has resulted in internal mass movement in the blank without substantial surface movement causing undesired strain which impaired the optical properties of the material. However, the glass surfaced die does impart an extremely high finish upon a surface of a blank of resinous material if there is substantially no movement of the surface of the material within the die. Hence, the glass die is used for the purpose of providing a surface finish upon the blank of resinous material.

Since the blank of resinous material passes through the same cycle of heating, formation and cooling, as described with regard to the die 15, and since the glass dies are not for the purpose of making any substantial correction upon the optically curved surfaces of the blank of resinous material, it may be seen that the heating cycle of the last operation will have a tendency to relieve the stress to a greater degree than either of the previous forming operations.

To provide an apparatus for conveniently carrying out the purposes of this invention, and since the rate of pressure application upon the dies in the various stages of formation of the resinous blank is substantially equal, I can provide an arrangement wherein the pressure upon all the molds is insured of being applied at an equal rate at all times. I have previously described the method of producing a lens or plano with regard to four different steps of operation. It is of course conceivable that any one of the intermediate steps can be eliminated. It is even conceivable that the process may be produced by the use of only two steps, namely, the forming of the blank of resinous material by mass movement of the material within metal dies, and polishing or surface finishing the thus formed blank within glass dies or glass surfaced dies.

In the arrangement for producing even distribution of forming pressure upon the various dies of a companion set, I provide preferably for the use of the cast dies 15, the plated dies 16, and the glass dies 17. In this arrangement, the dies 15, 16 and 17 have their lower halves 15a, 16a and 17a positioned upon a base 60 of a press. The upper halves 15b, 16b and 17b are suspended from a movable press platen 61 by means of ball and socket joints 62. The movable press platen 61 is connected to the press plunger 63 by means of a ball and socket joint 64. The dies 15, 16 and 17 are arranged upon the base 60 of the press in a manner that their central vertical axes pass through the apexes of an equilateral triangle. Thus, when the press platen 61 is moved downwardly carrying the upper halves of the dies into engagement with the lower halves, the pressure applied by the plunger 63 will be evenly distributed between the three dies 15, 16 and 17 respectively.

To prevent axial mis-alignment of the upper halves of the dies, with respect the lower halves thereof, a pair of vertical guide rods 65 is provided for each of the movable dies 15b, 16b and 17b. These guide rods extend through ears 66 extending from the respective movable die halves 15b, 16b and 17b, whereby the movable die halves are guided in their vertical axial relation with respect the lower or stationary die halves 15a, 16a and 17a. This arrangement has particular merit with regard to applicant's method of producing lenses in that three blanks of resinous material can be simultaneously formed in different steps of formation, insuring that the pressure of formation and the rate of pressure application upon the resinous lens blank will be identically the same for all of the steps of formation of the particular lens.

As a modified arrangement for providing even distribution of pressure between other pluralities of die members, I provide a die carrying platen 70 (see Figure 10) which carries a plurality of stationary die members 71. These die members 71 are provided with threaded extending portions 72 which engage threaded openings 73 in the die carrying platen 70. The dies 71 may be adjusted vertically to bring them all to substantially the same height, consideration being given the slight varying thickness of the lens which can be formed within the various die members. Set screws 74 are provided to retain the dies 71 and properly adjust their positions.

While the form and embodiment of the invention has been described with regard to specific apparatus, the invention is not to be limited except as to means and apparatus coming within the purview of the claims.

Having thus fully described my invention, what I claim as new and desire to secure by Letters Patent, is:

1. An apparatus for simultaneously producing a plurality of forming operations upon a plurality of blanks of resinous material to form ophthalmic articles which includes, a plurality of pairs of cooperating forming dies, means rigidly supporting one of the halves of each pair of forming dies, movable means for supporting the opposite half of each of said forming dies for producing relative movement therebetween, a single pivot means for suspending each of said opposite halves of each of said forming dies upon said movable means to permit complete freedom of swinging movement of said die half relative to said supporting means, means for moving said movable means, and a single pivot means for suspending said movable means upon the means for moving the same for complete freedom of swinging movement relative thereto whereby said movable means and said dies carried thereby have freedom of movement to cause equal distribution of pressure upon blanks of resinous material that are disposed between said co-operating dies.

2. An apparatus for simultaneously producing a plurality of forming operations upon a plurality of blanks of resinous material to form ophthalmic articles which includes, a plurality of pairs of co-operating forming dies, means rigidly supporting one of the halves of each pair of forming dies, movable means for supporting the opposite half of each of said forming dies for producing relative movement therebetween, a single pivot means for suspending each of said opposite halves of each of said forming dies upon said movable means to permit complete freedom of swinging movement of said die half relative to said supporting means, means for moving said movable means, a single pivot means for suspending said movable means upon the means for moving the same for complete freedom of swinging movement relative thereto whereby said movable means and said dies carried thereby have freedom of movement to cause equal distribution of pressure upon blanks of resinous material that are disposed between said co-operating dies, and means disposed parallel to the axis of said co-operating dies for guiding the same in axial alignment with one another.

3. An apparatus for simultaneously producing a plurality of forming operations upon a plurality of blanks of resinous material which consists of a plurality of pairs of forming dies, means rigidly supporting one of the halves of each pair of forming dies, movable means for supporting the opposite half of each of said forming dies, pivot means consisting of a ball and socket joint for supporting said other half of each of said forming dies upon said movable means, power means, and means consisting of a ball and socket joint for pivotally supporting said movable means upon said power means, whereby said movable means and said dies carried thereby are movable with respect to each other and with respect to said power means to cause equal distribution of pressure from said power means to all of said dies.

4. An apparatus for simultaneously producing a plurality of forming operations upon a plurality of blanks of resinous material which consists of a plurality of pairs of forming dies, means for adjusting the relative positions of each of said dies with respect to one another for disposing the die faces thereof in proper horizontal relationship with respect to one another to accommodate resinous blanks of slightly different thickness, means rigidly supporting one of the halves of each pair of forming dies, movable means for supporting the opposite half of each of said forming dies, flexible means consisting of ball and socket joints for supporting said other half of each of said forming dies upon said movable means, power means, and means consisting of ball and socket joints flexibly supporting said movable means upon said power means, whereby said movable means and said dies carried thereby are movable with respect to each other and with respect to said power means to cause equal distribution of pressure from said power means to all of said dies.

CHARLES V. SMITH.